United States Patent Office 3,682,695
Patented Aug. 8, 1972

---

3,682,695
METALLIZED POLYOLEFIN SUBSTRATES CONTAINING TERPENEPHENOLIC RESINS
Habet M. Khelghatian and Wassily Poppe, Springfield, Pa., and Harry J. West, Wilmington, Del., assignors to Avisun Corporation, Philadelphia, Pa.
No Drawing. Filed Jan. 6, 1969, Ser. No. 789,344
Int. Cl. B44d 1/22
U.S. Cl. 117—138.8 E      5 Claims

ABSTRACT OF THE DISCLOSURE

Solid, substantially crystalline polyolefin compositions are provided from blends of a polyolefin and from about 1% to about 55% by weight of a compatible thermoplastic adhesion-promoting terpene-phenolic resin modifier. The modified compositions have improved adherency for coatings such as paints and electroplated metals.

BACKGROUND OF THE INVENTION

This invention relates to solid, substantially crystalline polyolefin compositions having improved adherency for coatings. It is well known in the art that unmodified polyolefin polymers, particularly polymers containing substantial amounts of polypropylene, are relatively non-adherent to such decorative coatings as paints, electroplated metals, printed designs and the like. Many attempts have been made to alter the properties of polyolefins to improve adhesion of subsequently applied coatings. Among the approaches attempted to improve the receptivity of crystalline polyolefin surfaces to coatings include modification of the surface by chemical etching in an acidic conditioning bath. In certain applications this approach has not been entirely satisfactory since the coating is not able to diffuse into the polyolefin surface to obtain good adherency. Other processes have involved a mechanical treatment such as roughening of the polymer surface to provide a substrate of increased surface area that will aid in bonding the coating to the polymer article. Still other processes that aid in improving the bond strength between the coating and the polymer article involve application of various adhesive layers to the surface of the polymer article.

Solid, substantially crystalline polyolefins are well known and represent a class of synthetic polymers that have enjoyed significantly increased commercial usage in the preparation of fibers, films and molded articles. However, their normally poor receptivity to decorative coatings has restricted development of crystalline polyolefins as shaped articles in such areas as the construction industry and the furniture industry.

In addition, metallized polyolefin articles may be used as substitutes for various construction materials. A metallized coating having good adhesion to the polyolefin substrate improves the structural properties of the plastic such as resistance to deformation and thereby enhances the use of metallizable polyolefins as a substitute for heavier base materials. Metallized polyolefins provide numerous advantages over plated metals and the most obvious advantage is the reduction in weight. Another is the elimination of highly corrosive bases or substrates. Frequently, a metallized polyolefin article is substituted for an equivalent metal part since tooling costs and finishing costs of buffing and polishing are reduced. In many cases, the speed of molding or casting coupled with the elimination of buffing are important considerations. Good adhesion between the metal coating and the polyolefin substrate improves physical properties such as hardness, abrasion resistance, impact strength, temperature deflection and flexural modulus. Metallized polyolefins may be applied in a wide variety of industrial uses in the automotive, appliance, plumbing, electronic, builders' hardware and other industries.

Although mixtures of atactic polypropylene and a modifier such as a terpene-phenolic resin are known as adhesive compositions (British patent specification No. 979,777), heretofore crystalline polyolefins have not been blended with a terpene-phenolic resin to impart surface adherency to such coatings as paints and electroplated metals.

SUMMARY OF THE INVENTION

It is an object of this invention to provide solid, substantially crystalline polyolefin compositions having a surface adherent to decorative coatings such as paints and plated metals. A further object of this invention is to provide polyolefins articles having painted surfaces resistant to gentle abrasions such as scraping or rubbing. Still another object of this invention is to provide a modified polyolefin substrate that will permit diffusion of paints and lacquers into the surface. Another object of this invention is to provide metallized polyolefin articles having an adherent metal layer bonded to the polyolefin substrate. It is a further object of this invention to provide solid, substantially crystalline polyolefin compositions that may be electroplated by a fast plating cycle.

These and other objects of the invention are accomplished by blending into the substantially crystalline polyolefin a compatible, thermoplastic, adhesion-promoting terpene-phenolic resin modifier in an amount of about 1% to about 55% by weight and preferably about 2.5% to about 20% by weight, based on the total weight of the polyolefin composition. The polyolefins that may be modified include substantially crystalline polymers derived from 1-alkenes having from 2 to 8 carbon atoms.

Terpene-phenolic resins useful for the purposes of this invention are known articles of commerce. Preferred terpene-phenolic resins have a softening point higher than about 70° C. as determined by the Ring and Ball method and the softening point may be as high as 150° C.

The polyolefin compositions may also contain one or more fillers such as the commonly employed mineral fillers or other additives to modify the composition for a particular application.

DESCRIPTION OF THE INVENTION

The polyolefins treated according to this invention include solid, substantially crystalline polymers which contain a major proportion (i.e., greater than 50%) of an aliphatic olefin having from 2 to 8 carbon atoms. Such polyolefins, therefore, include polyethylene, substantially crystalline polypropylene, ethylene propylene block or random copolymers, ethylene butene-1 block or random copolymers, polybutene-1, poly(4-methylpentene-1), poly(3-methylbutene-1), and the like. The term polyolefin as used herein is, furthermore, intended to include copolymers of hydrocarbon monomers with copolymerizable polar monomers in which such functional monomers constitute a minor proportion of the copolymer. Functional monomers frequently employed in combination with hydrocarbon monomers are in particular the acrylic monomers such as methyl methacrylate, ethyl acrylate, and acrylonitrile and the vinyl esters such as vinyl acetate. Particularly useful polyolefins are those that are substantially crystalline polymers derived from 1-alkenes having from 3 to 8 carbon atoms i.e., polymers containing at least 25%, and preferably at least 50% crystallinity as determined by density-crystallinity relationships, a type of technique described by J. A. Gailey et al., SPE Technical Papers (ANTEC), vol. IX, Session IV–1, pages 1 to 4, February 1963.

Terpene-phenolic resins useful for the purpose of this invention are known articles of commerce and are widely used in the manufacture of paints and varnishes. These synthetic resins are prepared from a terpene and a phenol wherein a terpene and a phenol are reacted in the presence of various catalysts, for example inorganic acids such as sulfuric acid and phosphoric acid, organic acids such as toluene sulfonic acid and metal halides such as aluminum trichloride, boron trifluoride and stannic chloride. The terpene component may be alpha-pinene, beta-pinene, dipentene, limonene, terpinene, turpentine, turpentine fraction from gum, wood or sulfate turpentines of commerce, and so on. Any phenol may be employed as the phenolic component and typical phenols include phenol itself, o,m,p-cresol, tertiary-butyl phenols and other alkylated phenols where in the alkyl group contains from 1 to 8 carbon atoms and preferably from 1 to 4 carbon atoms. Aryl substituted phenols such as p-phenylphenol may be used as well as polyhydroxy phenols, resorcinol and pyrocatechol. The terpene-phenolic resins prepared in the above manner are characterized by solubility in common aromatic and aliphatic hydrocarbon solvents. For purposes of this invention, preferred terpene-phenolic resins have a softening point of at least about 70° C., as determined by the Ring and Ball method, and the softening point may be as high as 150°.

Terpene-phenolic resins are described in Protective and Decorative Coatings, vol. 1, pp. 568–9, J. J. Mattiello, John Wiley and Sons, New York, 1941. The technical descriptions in this reference together with the publications listed in the bibliography are hereby incorporated into this disclosure.

The polyolefin compositions, particularly those formulated for paintable substrates, may optionally contain a filler in an amount varying from 0% to about 50% by weight, and preferably about 5% to about 40% by weight, based on the total weight of the polyolefin composition. A filler may provide the additional benefit of aiding in dispersing the terpene-phenolic resin modifier throughout the polyolefin composition. Commonly employed fillers that may be used are calcium carbonate (including limestone flour), barium sulfates (including barites), calcium silicates, magnesium silicates, aluminum silicates, mica, talc, bentonite, clay, alumina hydrate, titanium dioxide, carbon black, zinc oxide, lead carbonate, calcium sulfate, diatomaceous earth, wood flour, glass fibers and asbestos fibers.

Additional additives that may be incorporated into the polyolefin composition, particularly if metallizable formulations are desired, include surfactants such as the nonionic alkylphenoxypolyalkoxyalkanols having alkyl groups of about 7 to 12 carbon atoms and from about 6 to 60 alkoxy groups. Representative surfactants include octylphenoxypolyethoxyethanols, heptylphenoxypolyethoxyethanols and nonylphenoxypolyethoxyethanols. When used, the surfactants may comprise from about 0.1% to 2% by weight of the polyolefin composition.

The solid, substantially crystalline polyolefin compositions of this invention may contain minor amounts of one or more other additives compatible with the blended composition such as stabilizers, plasticizers, pigments, dyes, anti-static agents, anti-oxidants and the like to modify the composition for a particular application.

The substantially crystalline polyolefin and the compatible, thermoplastic, resinous, adhesion-promoting terpene-phenolic resin modifier together with other optional additives may be blended by conventional techniques. Generally, the polyolefin composition will contain a filler which appears to provide the additional benefit of aiding substantially uniform incorporation of the thermoplastic resinous modifier throughout the polyolefin composition. The polyolefin and the thermoplastic resinous modifier may be melt blended and mechanically stirred in such equipment as extruders, stirred mixers or milling rolls and then formed, with cooling, into molded, shaped articles that may subsequently be coated. Also the polyolefin and modifier in pulverulent form may be dry blended. Alternatively, the polyolefin and the resinous modifier may be dissolved together in a hydrocarbon solvent and precipitated by cooling or by an anti-solvent or by both methods. Another technique useful in blending is to dissolve the components in a hot hydrocarbon solvent such as n-heptane followed by evaporation of the solvent. Following blending, the composition is prepared for a molding or melt-extrusion procedure and a shaping and cooling technique.

The modified substantially crystalline polyolefins of the present invention are shaped into the article desired to be coated by any of the means heretofore employed for the preparation of such articles inclusive of which are compression molding and injection molding. The shaped articles have improved adherability for decorative and protective coatings. Furthermore, the shaped articles provide a substrate capable of adherency to metallic coatings deposited by such methods as electroplating and vacuum metallizing.

The polyolefin shaped articles may be metallized by conventional techniques known in the art. A variety of processes have been developed for the metallizing of non-conductive surfaces and in particular, plastics, but electroplating and vacuum metallizing are the most common. Although various commercial processes are employed to electroplate a non-conductive substrate, the same general steps are usually employed and these involve conditioning the base member, sensitizing, activating, applying an electrodes copper conductor and thereafter electroplating a finish metal to the polyolefin base member. Thus, the plating of articles made from the modified polyolefins of the present invention is generally conducted using the following steps:

(1) The surface to be plated is cleaned using a mild alkaline bath to remove oils, mold release agents and fingerprints.

(2) The alkaline material retained by the surface is neutralized using a mild acid.

(3) The clean surface is then chemically etched with a conditioner containing concentrated mineral acid such as sulfuric acid and chromic trioxide or a chromate.

(4) The resulting etched surface is sensitized with a readily oxidizable tin salt solution such as stannous chloride which causes tin to be absorbed on the surface.

(5) The surface is then activated or nucleated by treatment with an aqueous solution of a noble metal salt such as palladium chloride which forms a metallic film at discrete activated sites.

(6) The activated surface is then subjected to electroless plating using copper, nickel, or cobalt as the metal. This is accomplished by immersing a treated surface in a solution of such metal salt containing in addition to the metal salt such as copper sulfate or nickel chloride, a reducing agent such as formaldehyde, trioxymethylene and the like. Sufficient copper, nickel or cobalt is deposited on the surface of the polyolefin article to achieve a continuous coating capable of conducting electricity.

(7) The electrodeposition of metal is then followed by conventionally plating of the surface with a finish metal such as copper, nickel and/or chromium or just nickel and chromium. The thickness of the electroplated coating is generally within the range of 0.1 to 1.5 mil.

It is, furthermore, highly desirable if not essential to rinse and clean the surface being treated with water between each of the steps outlined and in some instances, it may also be desirable to dry the surface between the various treating steps. Since the various outlined steps employed in the electroplating of non-conducting surfaces and particularly plastic surfaces are well known in the electroplating art, no further description is deemed necessary for a full understanding of the present invention. The polyolefin compositions of the present invention can be employed in electroplating using any of the processes heretofore developed for electroplating plastic and particularly polyolefin surfaces.

Alternatively, a metallic coating may be applied to the polyolefin base member by vacuum metallizing. This well known and conventional procedure involves the principle of evaporation of metals under high vacuum. Representative of typical metals that may be applied using this technique include aluminum, copper and silver. Generally, vacuum metallizing involves the steps of (a) applying a suitable undercoat or prime coat to the polyolefin article, (b) evaporating the desired metal under high vacuum, and (c) applying a topcoat lacquer to protect the thin metallic deposit. Suitable undercoats that are applied to the polyolefin article are well known and are generally a dispersion or solution of an acid containing polymer such as carboxylated butadiene polymers, and maleic anhydride modified atactic polypropylene polymers. As the topcoat, any commercially available thermosetting acrylic lacquer may be used. The deposited metal film is thin and opaque, ranging from thicknesses of 0.15 micron to 1.0 micron.

The polyolefin compositions of the present invention are particularly suitable in the electroplating of articles made from the modified polyolefins described in this invention in that they give rise to a greatly improved bond strength between the metal plate and the polyolefin substrate. Although the adhesion of metal plate to the substrate can be measured by various tests, bond strength is preferably measured by the pull test in which two parallel cuts are made into the plated metal coating ½ inch apart and an additional vertical cut is made to form a tab; one end of the resulting tab then being raised sufficiently to allow gripping by a tensile testing machine; the specimen is then placed into a tensile rig and the tab is pulled vertically from the surface. The force required to pull the tab is measured as the bond strength. For most applications a bond strength of 6 to 10 lbs./in. is adequate, but if the plated article in use is to be subjected to mechanical shock or extremes of temperature, bond strengths up to 25 lbs./in. or more may be desirable.

Decorative and protective coatings such as paints may be applied to the surface of the substantially crystalline shaped polyolefin article by conventional means including brushing, spraying and the like. In order to evaluate the adherability of coatings such as paints and lacquers to the surface of the shaped polyolefin article, laboratroy scale tests were devised. In the first test, a ¾ inch "Scotch Brand" paint testing tape is applied to a small portion of the coated surface. Thereafter pressure is applied to the tape with a finger or other object so that the tape is firmly bonded to the painted surface. The tape is then stripped from the painted surface by an abrupt motion of the hand. If none of the coating is removed, as observed by the unaided eye, the adherency of the coating is rated as passing. If the coated polyolefin composition passes the first test, a second test is conducted. In this test, a series of parallel lines about 1⁄16" apart is cut on the painted surface with a razor blade or similar cutting tool. Then another series of parallel lines spaced approximately 1⁄16" apart is cut at right angles to the first series thus forming a cross-hatched pattern. As in the first test, paint testing tape is applied to the cross-hatched area and bonded firmly to the surface with pressure. Then the tape is abruptly stripped from the surface. If more than about 75% of the paint remains bonded to the polyolefin surface, the coating is rated passing and a third test is performed. This test is performed by cutting with a razor blade an elongated "X" on the surface of the polyolefin article that is approximately ½" in width and about 1" in length. The two straight lines forming the "X" are drawn to intersect at an angle of about 150 degrees. Standard ¾ inch "Scotch Brand" tape is applied to cover the "X" and about 3 additional inches of the coated surface. Again the tape is firmly grasped with two fingers and pulled sharply to free the tape in such a manner that the force exerted is as nearly as possible in the plane of the surface. The adhesion is rated according to the amount of coating removed from the surface. An excellent rating indicates slight peeling near the cut or essentially no peeling. Adhesion ratings of poor, fair, good and very good are determined by observation of the amount of peeling of the coating from the substrate.

For purposes of illustrating the invention, the following examples are provided wherein, unless otherwise indicated, all parts and percentages are by weight:

Example 1

A polymer composition was prepared by blending (a) 95 parts of a crystalline propylene homopolymer powder having a flow rate of 3.4 (ASTM D1238–62T) containing, as an additive and stabilizer system, 0.5% of dilauryl thiodipropionate, 0.2% of 2,6-ditertiary butyl 4-methyl phenol, 0.15% of calcium stearate and 5% of $TiO_2$, and (b) 5 parts of a thermoplastic terpene-phenolic resin (Picco LTP–135, available from Pennsylvania Industrial Chemical Corporation) having the following properties:

Ring and ball softening point _____° C__ 135
Acid number _____ Nil
Specific gravity _____ 1.03
Color (Gardner) _____ 7

The terpene-phenolic modifier was dry blended with the polypropylene for 90 minutes and then melt extruded and ground into molding powder. Plaques, 5" x 5" x 110 mil, were compression molded by conventional apparatus.

The plaques were immersed consecutively in a conditioner consisting of 55% sulfuric acid (96% concentration), 10% potassium dichromate and 35% water for a period of 10 minutes at 80° C.; in a stannous chloride sensitizer solution containing per liter of solution 10 g. of $SnCl_2$ and 40 ml. of HCl at ambient temperatures of 1 to 3 minutes; in an activator solution containing per gallon of solution 1 g. of palladium chloride and 10 ml. of HCl for a period of 1 to 2 minutes at ambient temperatures; and in an electroless copper plating solution containing per liter of solution 29 g. of copper sulfate, 140 g. of Rochelle salt, 40 g. of sodium hydroxide and 166 g. of formaldehyde (37% solution) at a temperature of 70° C. for a period sufficient to obtain a continuous coating capable of conducting electricity. Between each of the immersions described, the plaque is thoroughly rinsed with distilled water The resulting plaque on washing with water was then electroplated with copper for about 20 minutes, at a current density of approximately 30 amps/sq. ft., resulting in about a 1 mil coating of copper on the plaque.

The bond strength of the electroplated metal to the polypropylene substrate, measured by the previously described bond strength test, was 21 lbs./in.

Example 2

Example 1 was repeated by dry blending the same polypropylene with another terpene-phenolic resin (Nirez V-2040, commercially available from Heyden-Newport Chemical Corporation) having the following properties:

Ring and ball softening point _____ °C__ 118
Capillary tube melting point _____ °C__ 100
Specific gravity at 25°/25° C. _____ 1.05

After blending for two hours, the composition was melt extruded and ground into molding powder. Evaluation of the bond strength of electroplated plaques gave similar results compared to Example 1.

Example 3

Example 2 was repeated except that the terpene-phenolic resin had the following properties:

Ring and ball softening point _____ °C__ 122
Capillary tube melting point _____ °C__ 105
Specific gravity at 25°/25° C. _____ 1.04

The adhesion of the electroplated coating was substantially similar to the value of Example 1.

Example 4

Ninety-five parts of a crystalline polypropylene homopolymer having a flow rate of 4.0 (ASTM-1238-62T) and containing 0.3% of dilauryl thiodipropionate, 0.2% of 2,6-ditertiary butyl 4-methyl phenol, 0.2% of calcium stearate, 5.0% of titanium dioxide and 0.5% of a nonionic surfactant of t-octylphenoxypolyethoxyethanol having an average of ten polyethoxy units were dry blended with 5 parts by weight, based on the weight of the polypropylene composition, of a terpene-phenolic resin having a softening point (Ring and Ball) of 100° C., a specific gravity of 1.02, a Gardner color of 7 and an acid number of approximately zero. Plaques were molded from the blended composition and electroplated according to the process described in Example 1. Evaluation of the bond strength showed good adhesion of the plated metal to the polyolefin substrate.

Example 5

Ninety parts of a crystalline propylene-ethylene terminal block copolymer powder having a flow rate of 4.0 and containing 0.3% of distearyl thiodipropionate, 0.2% of calcium stearate, 0.2% of 2,6-ditertiarybutyl-4-methyl phenol and 5% of titanium dioxide were dry blended with 10 parts of a terpene-phenolic resin (Picco LTP-115, available from Pennsylvania Industrial Chemical Corporation) having the following characteristics:

Ring and ball softening point _____ °C__ 115
Acid number _____ Nil
Specific gravity _____ 1.02
Color (Gardner) _____ 7

Molded plaques were electroplated according to the procedure of Example 1 and excellent bond strengths were obtained.

Example 6

Eighty-five parts of a crystalline propylene-ethylene terminal block copolymer having a flow rate of 4.0 and containing 0.2% of calcium stearate, 0.2% of 2,6-ditertiary butyl 4-methyl phenol, and 5.0% of titanium dioxide were modified by dry blending 15 parts of the terpene-phenolic resin described in Example 1. Molded plaques from the blended composition were treated in a rapid plating cycle of 6½ minutes by consecutively immersing in the conditioner for ½ minute at 80° C. followed by ½ minute each in the sensitizer and activator solution and then 5 minutes in the electroless copper bath. After final electroplating, excellent adhesion of the plated metal to the polyolefin substrate was obtained.

Example 7

(a) 96.5 parts of the crystalline polypropylene homopolymer of Example 1 were blended with 3.5 parts of the terpene phenolic resin of Example 1. Plaques were molded from the composition and electroplated according to the procedure in Example 1 with the exception that the plaques were immersed in the same conditioner for only 1 minute at 88° C., ½ minute in the stannous fluoride sensitizer, ½ minute in the palladium chloride activator and then 5 minutes in the electroless copper solution. An excellent electroless coating was obtained that is suitable for final electroplating and there was no evidence of blistering. The plaques having the electroless coating were immersed in an electrolytic copper bath. Following this electroplating step, the bond strength of the copper coating to the polypropylene base member was measured and found to average 18–20 lbs./in.

(b) For comparative purposes, the aforementioned plating cycle was repeated with plaques prepared from the same polypropylene containing identical stabilizers and other additives but excluding the adhesion-promoting terpene-phenolic resin modifier. Molded plaques from this polypropylene were subjected to the same cycle of conditioning, sensitizing, activating and electroless plating. Severe blistering occurred.

The following examples illustrate polyolefin compositions having improved adherability for paintable coatings:

Example 8

(a) A polymer composition was prepared by blending in a mixer having heated rollers the following components: (a) 65 parts of a crystalline polypropylene homopolymer having a flow rate of 3.4 (ASTM-D-1238-62T) and containing 0.3% of dilauryl thiodipropionate, 0.2% of calcium stearate and 0.2% of 2,6-ditertiary-butyl 4-methyl phenol; (b) 16 parts of a commercially available, finely-divided talc; (c) 16 parts of a terpene-phenolic resin having a softening point (Ring and Ball) of 100° C., an acid number less than 1 and a specific gravity of 1.02 (commercially available from Pennsylvania Industrial Chemical Corporation as Picco LTP-100); and (d) 3 parts of dioctyl phthalate (plasticizer). After blending for 90 minutes, the composition was melt extruded at 210° C. and ground into molding powder.

Plaques, 8″ x 8″ x 110 mil, were compression molded by conventional apparatus. Two plaques were brush coated with a blue paint containing a vinyltoluene linseed oil modified alkyd resin as the vehicle. The coating was evaluated for adhesion according to the previously-described laboratory scale tests. The coatings easily passed the first two adhesion tests and received a very good rating on the third test.

(b) For purposes of comparison to demonstrate the effectiveness of the terpene-phenolic resin modifier, the example was repeated except that the terpene-phenolic resin was omitted and 81 parts of the crystalline polypropylene were employed. Again a plaque was molded from this composition and similarly coated with the same paint formulation. The coating failed the first adhesion test thus indicating the outstanding adherability of paintable coatings to a crystalline polyolefin substrate modified with a terpene-phenolic resin.

Example 9

A polymer composition was prepared by dry blending the following components: (a) 75 parts of a crystalline propylene-ethylene terminal block copolymer having a flow rate of 4.0 and containing 0.4% distearyl thiodipropionate, 0.2% of calcium stearate and 0.2% of 2,6-ditertiarybutyl 4-methyl phenol; (b) 21 parts of the terpene-phenolic resin described in Example 1; and (c) 4 parts of dibutyl phthalate. The components were blended for 90 minutes and the composition melt extruded at 210° C., then ground into molding powder. A plaque, 5″ x 5″ x 110 mil., was compression molded with conventional apparatus and thereafter coated with the paint formulation described in Example 8. After drying at room temperature, the coating was evaluated for adhesion by the tests previously described and received a rating of fair in the third adhesion test.

Example 10

Example 8 was repeated except that the terpene-phenolic resin modifier of Example 2 was employed. A molded plaque was coated with the paint formulation of Example 8 and a rating of very good was obtained in the third adhesion test.

Example 11

The following components were milled together: (a) 45 parts of a crystalline polypropylene homopolymer having a flow rate of 11.0; (b) 15 parts of the terpene-phenolic resin described in Example 1; (c) 25 parts of asbestos fibers; and (4) 15 parts of finely-divided hydrated synthetic calcium silicate (Micro-Cel E). The composition was blended for 90 minutes and then melt extruded at 210° C.

The plaques were compression molded and then brush coated with a paint having a vinyltoluene soya modified alkyd resin as the vehicle. After the coating dried, adhesion was evaluated following the previously described laboratory scale tests. The coatings passed the first two adhesion tests and received an average rating of very good to excellent on the third test.

Example 12

A polyolefin composition was prepared from the below-listed components: (a) 50 parts of the propylene-ethylene terminal block copolymer described in Example 9; (b) 10 parts of the terpene-phenolic resin described in Example 1; and 40 parts of asbestos fiber. After compression molding several plaques from this composition and spray coating them with the paint formulation of Example 11, adhesion was evaluated. The coating passed the first two tests and was rated very good in the third adhesion test.

We claim:

1. A metallized polyolefin shaped article comprising a polyolefin base member and an adherent metal layer bonded to the polyolefin base member wherein said polyolefin base member contains a blend of a substantially crystalline polyolefin and from about 1% to about 55% by weight, based on the total weight of said base member, of a compatible, thermoplastic terpene-phenolic resin.

2. A metallized article according to claim 1 wherein said polyolefin is a solid, substantially crystalline propylene polymer.

3. A metallized article according to claim 1 wherein said terpene-phenolic resin comprises about 2.5% to about 20% by weight based on the total weight of said base member.

4. A metallized article according to claim 1 wherein said polyolefin is a solid, substantially crystalline propylene polymer and said terpene-phenolic resin has a softening point of at least about 70° C. as determined by the Ring and Ball method.

5. A metallized article according to claim 1 wherein said polyolefin is a solid, substantially crystalline polypropylene and said terpene-phenolic resin comprises about 2.5% to about 20% by weight based on the weight of said polyolefin base member.

References Cited

UNITED STATES PATENTS

| | | | |
|---|---|---|---|
| 2,668,134 | 2/1954 | Horton | 117—47 R UX |
| 2,772,247 | 11/1956 | Schroeder | 260—27 |
| 3,160,514 | 12/1964 | Wheelock | 117—138.8 E |
| 3,256,368 | 6/1966 | Soldgtos et al. | 260—848 |
| 3,347,724 | 10/1967 | Schneble | 117—47 A |
| 3,483,276 | 12/1969 | Mahlman | 260—848 |

ALFRED L. LEAVITT, Primary Examiner

J. A. BELL, Assistant Examiner

U.S. Cl. X.R.

117—47 A 160 R; 260—27 R, 848

PO-1050
(5/69)

UNITED STATES PATENT OFFICE
CERTIFICATE OF CORRECTION

Patent No. 3,682,695      Dated Aug. 8, 1972

Inventor(s) H. M. Khelghatian, W. Poppe and H. J. West

It is certified that error appears in the above-identified patent and that said Letters Patent are hereby corrected as shown below:

Column 4, line 41 "electrodes" should be --electroless--. Column 5, line 58, "laboratroy" should be --laboratory--; line 72, "11/16"" should be --1/16"--. Column 7, line 71, "poypropylene" should be --polypropylene--. Column 9, line 13, "(4)" should be --(d)--.

Signed and sealed this 9th day of January 1973.

(SEAL)
Attest:

EDWARD M. FLETCHER, JR.
Attesting Officer

ROBERT GOTTSCHALK
Commissioner of Patents